Aug. 28, 1928.

L. E. PORTER 1,682,307

INTERNAL COMBUSTION ENGINE

Filed June 21, 1921  2 Sheets-Sheet 2

INVENTOR:
LEWIS E. PORTER
By Graham + Lewis
ATTORNEYS.

Patented Aug. 28, 1928.

1,682,307

UNITED STATES PATENT OFFICE.

LEWIS E. PORTER, OF LOS ANGELES, CALIFORNIA; JESSIE BERYLE PORTER EXECUTRIX OF SAID LEWIS E. PORTER, DECEASED.

INTERNAL-COMBUSTION ENGINE.

Application filed June 21, 1921. Serial No. 479,199.

My invention relates to internal combustion engines. In all such engines a portion of the energy latent in the fuel appears as heat in the engine cylinder, and it is common practice to absorb this heat by water jackets or otherwise, the heat so absorbed being ordinarily finally dissipated by air cooling.

Where water jackets are used, the pistons and cylinders are considerably hotter than the water, the difference in temperature between the inner walls of the cylinder and the cooling water being due to the thermal resistance of the cylinder walls.

It is an object of my invention to provide means to absorb the excess heat units generated in an internal combustion engine by direct introduction of water or other cooling medium into the interior of the engine cylinder, thus providing a perfect control of the temperatures therein.

It is a further object of my invention to provide means for utilizing the energy of the heat units so absorbed and thereby increase the efficiency of the engine, this energy appearing as useful work. This I accomplish by allowing the cooling medium to expand in the cylinder and to deliver its energy to the piston. In practice I prefer to use water as a cooling medium.

In my invention water is pumped through a jacket heated by the exhaust gases from which the latent heat of vaporization is removed, the water being thereby held in liquid form under pressure at a temperature above the atmospheric boiling point of water. The hot water is then injected into the combustion chamber of the engine by the means of a special timing device which varies the time of injection and quantity of water injected, so that the water is used to best advantage in creating steam pressure for a steam expansion working stroke following the usual explosion stroke of the explosive mixture.

The generation of steam is facilitated by spraying water forcibly against the highly heated parts of the engine and into air and burned gas which has been further heated by compression. In this manner, the steam is superheated and may be expanded effectively.

Referring to the drawings which are for illustrative purposes only,

Figure 1:
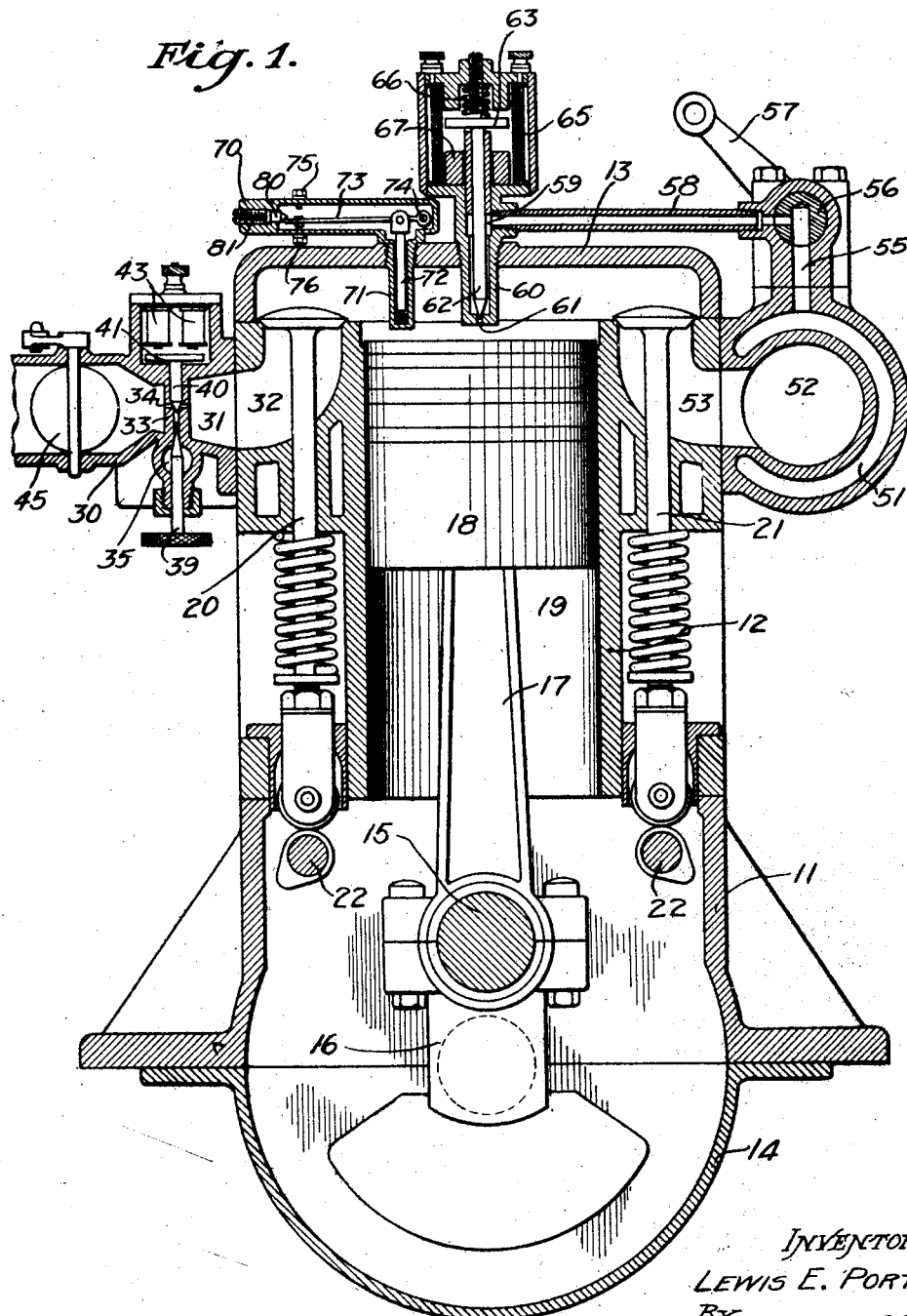
Fig. 1 is a vertical cross section through a standard form of internal combustion engine to which my invention has been applied.
Figure 2:
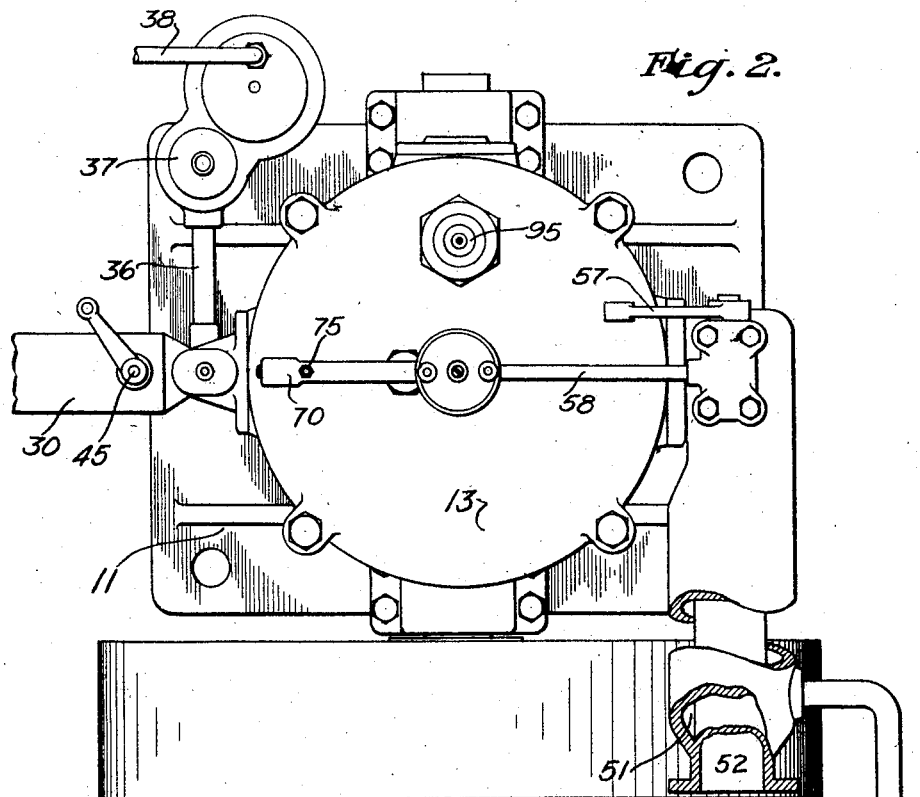
Fig. 2 is a plan view of same, this plan view being shown partly in section to better illustrate the invention.
Figure 3:
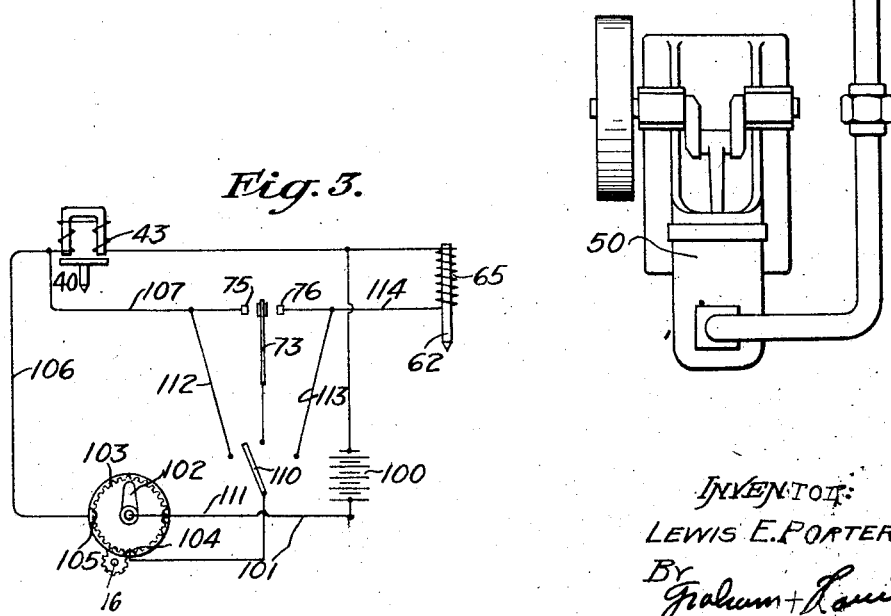
Fig. 3 is a diagram of connections; and this figure is incidentally utilized to suggest a four-to-one ratio between the rotations of a crank shaft and a timer arm.

The invention is applied to a standard internal combustion engine which comprises a main casting 11, a cylinder casting 12, a head 13 and a pan 14. A crank pin 15 forming a portion of a crank shaft 16 is connected by means of a connecting rod 17 with a piston 18, the piston 18 moving in a cylinder 19. An intake valve 20 and an exhaust valve 21 are provided, these valves being moved in the ordinary manner by means of cam shafts 22. The above embodiment is a standard internal combustion engine and forms no part of the present invention.

For the purpose of adapting my invention to use in such an engine, I supply a member 30 which has an opening 31 registering with the intake opening 32 of the engine. Centrally formed in the opening 31 is a post 33 having gasoline ports or openings 34 therethrough. The gasoline ports 34 are fed with gasoline from a channel 35 which is fed with gasoline through a pipe 36 from a standard float chamber 37, the float chamber being supplied with gasoline through a pipe 38. An adjustable needle valve 39 regulates the rate of flow of gasoline from the channel 35 through the gasoline ports 34. The ports 34 are somewhat below the level of liquid in the float chamber so that the gasoline from the float chamber is forced outwardly in a fine spray into the path of the air taken into the engine through the openings 32. The gasoline ports 34 may be closed by a gasoline valve 40, this valve having an armature 41 connected thereto which is drawn upwardly by means of two magnets 43. When the magnets 43 are energized, the ports 34 are opened, and the gasoline injection takes place into the incoming air. At all other times, the ports 34 are closed. For the purpose of controlling the engine, a throttle valve 45 may be provided in the opening 31.

For the purpose of supplying water to the engine, a small pump 50 is provided which may be run from the engine or driven by any other suitable source of power. This pump forces water into a water heating chamber 51 surrounding an exhaust passage 52 which is connected to the exhaust opening 53 of the engine. Water under pressure is forced through the chamber 51 passing therefrom through an opening 55, and through a throttle valve 56 operated by a lever 57. The water is then forced through a pipe 58 into a space 59 in a water injector member 60. The space 59 is provided with a small opening 61 in the extreme bottom thereof, this opening being closed by a water valve 62 having a head 63. A small spring 66 tends to hold the valve 62 on its seat, closing the opening 61. An iron core 67 surrounds the valve stem 62 and is pulled violently upwardly, striking against the head 63 whenever a branch including a winding 65 is energized, thus instantly and effectively lifting the valve 62 from its seat.

I also provide a thermostat 70 consisting of a casing 71 in which is secured a metal rod 72, the casing 71 and the rod 72 having different co-efficients of expansion, the casing 71 expanding the most under the influence of heat, the rod 72 operating a lever 73 pivoted at 74 to make contact with the stationary contact 75 or a stationary contact 76. A small cone 80 forced outwardly by a spring 81 tends to hold the member 73 in contact with either the member 75 or the member 76. The member 73 is formed of spring steel which must be under considerable tension in either direction to allow the members 73 to snap up or down against the action of the member 80.

A battery or other source of power 100 is provided, one terminal of this battery being connected through a wire 101 with a rotating member 102 of a timer 103. The rotating member makes contact with fixed members 104 and 105. The timer 103 runs in synchronism with the ordinary timer controlling the spark of the engine. The contact 105 is connected through a wire 106 a branch of which includes the windings 65, with the other side of the battery 100, so that whenever the contact 102 touches the contact 105, the magnets 43 are energized and the valve 40 is raised from its seat thus opening the gasoline ports 34 and giving a fuel injection into the opening 31. The contact 75 is also connected through a wire 107 to the windings 43 and through these windings to one side of the battery 100.

A switch 110 is provided which is arranged to connect contact 104 through a wire 111 with either the thermostat element 73, or through a wire 112 to the wire 107, or through a wire 113 with a wire 114 which is connected to the winding 65 and through this winding with the other side of the battery. The thermostat is so set that when the engine is cold, the thermostat element 73 makes contact with the contact 75.

The engine may be operated as a standard internal combustion engine by connecting the contact 104 with the wire 107 through the switch 110 and the wire 112. Under these circumstances, the rotating member 102 will actuate the valve 40 every time it touches the contact 105 or the contact 104. The engine illustrated is a four stroke cycle engine. The timer 103 is so connected to the standard timer that this injection of fuel takes place during the intake stroke of the engine which occurs on the alternate down strokes of the piston. This necessitates the timer 103 being so connected to the engine mechanism that the member 102 makes one complete revolution for each four revolutions of the crank shaft of the engine. The engine also functions as a standard internal combustion engine if the switch 110 is thrown to connect the contact 104 with the contact 73 so long as the thermostat member 73 remains in contact with the member 75. Under these conditions, in injection of fuel occurs on each intake stroke of the engine. As soon, however, as the engine becomes heated to a certain degree, the difference in expansion between the thermostatic members 71 and 72 puts the thermostat element 73 under tension against the member 80, this tension being increased until the member 73 snaps from the member 75 to the member 76. Under these conditions, the engine on each alternate intake stroke functions as a steam engine. This is due to the fact that when the rotating member 102 touches the member 104, under these conditions, a circuit is completed from the battery through the wire 101 through the members 102 to 104 through the wire 111, and the switch 110 to the thermostat 73 through the contact 76 and the wire 114 to the winding 65, and from thence to the side of the battery 100. As a result the valve 62 is lifted whenever the contact 102 touches the contact 104 and is held up so long as these members are in contact. The lifting of valve 62 is so timed that it occurs during what would otherwise be the compression stroke of the engine.

During the previous operation of the engine, as an internal combustion engine, the water in the space 51 has been highly heated, preferably above 212° F. This heating does not necessarily result in the formation of steam as the water is preferably under considerable pressure. Whenever the water valve 62 opens, due to the member 67 striking it a sharp blow, a portion of this water escapes in the form of a fine jet striking against the highly heated end of the piston 18 and spreading in a fine spray throughout the interior of the cylinder 19 above the piston 18. This space is previously full of compressed gases which were left in the cylinder which are themselves highly heated and the injection of the water against the heated walls of the piston and cylinder results in the formation of steam which is to a certain extent superheated by these hot gases. This formation of steam takes place at or near the beginning of what would be ordinarily regarded as the explosion stroke of the engine. Due, however, to the action of the thermostat, no fuel has been supplied to the engine during its previous intake stroke and no explosion takes place, the steam, however, being allowed to expand and drive the piston down. This expansion of the steam serves to deliver useful power which is derived from the waste heat previously carried in the cylinder walls. With the thermostat element 73 touching the contact 76, the engine passes through a complete cycle consisting of eight strokes which may be described as follows:

On the first down stroke, the engine takes in air through the opening 32, this air being mixed with fuel due to the fact that the contact 102 has touched the contact 105 and opened the valve 40. This fuel is thoroughly mixed with the air, passing into the interior of the cylinder on its first down stroke, the valve 20 closing at the end of the stroke and allowing the explosive mixture to be compressed in the upstroke. At or near the end of the compression stroke, the charge is fired in the ordinary manner through a spark plug 95 from a standard ignition system, not shown.

On the third or expansion stroke, this being the second down stroke, this explosion is allowed to do useful work forcing the piston down. At the conclusion of this stroke, the valve 21 opens and on the fourth or scavenging stroke, or the second up stroke, products of combustion are expelled through the opening 53. These products of combustion serve to heat the water in the chamber 51.

During these four strokes, the engine has functioned exactly like a standard four stroke cycle internal combustion engine. If the engine is sufficiently hot at this time to hold the thermostat contact 73 in contact with the contact 76, the engine during the next four strokes acts as a steam engine, no injection of fuel taking place on the fifth stroke, a charge of air being drawn into the cylinder, however, which is practically free from fuel due to the fact that the valve 40 remains closed. This charge of air tends to extract heat from the cylinder walls and from the piston; and the injection of water thereafter starts, through the valve 61.

During a subsequent stroke, the steam formed from this water is allowed to expand and do useful work; and during a final up stroke, the expanded steam is forced out through the opening 53, the exhaust valve 21 opening for this purpose.

Whenever the temperature of the engine falls to a predetermined minimum, the member 73 snaps back, cutting off the winding and allowing the magnets 43 to be energized on each intake stroke. The engine then functions as a standard internal combustion engine until it gets hot enough to snap the thermostat over and cut in the water valve.

If it is desired to run with alternate steam strokes, independent of the thermostat, the switch 110 is thrown over to make contact on the wire 113 and the engine thereafter operates independently of the thermostat to alternately act as an internal combustion and as a steam engine. The flow of water may be controlled or shut off by the valve 56.

It will be seen that my invention comprises an internal combustion engine which is so arranged that the heat ordinarily wasted in the water jacket is utilized to form steam which in turn is used to perform useful work. I have shown and described my invention as applied to a standard four-stroke cycle gasoline engine, but by a suitable arrangement of fuel valves it may be applied to Diesel or semi-Diesel engines and it may, of course, by a suitable arrangement of the timer and exhaust ports be applied to a two-stroke as well as to a four-stroke cycle engine.

I claim as my invention:

1. In an engine, the combination of: a cylinder; a piston fitting and moving in said cylinder; means for introducing an explosive charge into said cylinder; means for firing said charge; means for introducing water into said cylinder; a thermostat actuated by the heat of the engine; means by which said thermostat renders inoperative said water introducing means whenever the temperature of said engine falls below a predetermined limit; and means by which said thermostat renders inoperative on some strokes said means for introducing an explosive charge whenever the temperature of said engine exceeds a certain limit.

2. In an engine, the combination of: a cylinder; a piston fitting and moving in said cylinder; means for introducing an explosive charge into said cylinder; means for firing said charge; means for introducing water into said cylinder; a thermostat actuated by the heat of the engine; means by which said thermostat renders inoperative said water introducing means whenever the temperature of said engine falls below a predetermined limit; and means by which said thermostat renders inoperative on some strokes said means for introducing an explosive charge whenever said means for introducing water is operative.

3. In an engine, the combination of: a cylinder; a piston fitting and moving in said cylinder; means for introducing an explosive charge into said cylinder, means for firing said charge; means for introducing water into said cylinder in such a manner that the expansion of the water may be utilized to produce power; a thermostat actuated by the heat of the engine; and timing means actuated by said thermostat to render said explosive charge introducing means ineffective on some strokes only, and only when the temperature of the engine exceeds a certain limit.

4. In an engine, the combination of: a cylinder; a piston fitting and moving in said cylinder; means for introducing an explosive charge into said cylinder; means for firing said charge; means for introducing water into said cylinder in such a manner that the expansion of the water may be utilized to produce power; a thermostat actuated by the heat of the engine; means by which said thermostat renders inoperative said water introducing means whenever the temperature of said engine falls below a predetermined limit; and means by which said thermostat renders inoperative only on some strokes said means for introducing an explosive charge whenever the temperature of said engine exceeds a certain limit.

5. In an engine, the combination of: a cylinder; a piston fitting and moving in said cylinder; means for introducing an explosive charge into said cylinder; means for firing said charge; means for introducing water into said cylinder in such a manner that the expansion of the water may be utilized to produce power; a thermostat actuated by the heat of the engine; means by which said thermostat renders inoperative said water introducing means whenever the temperature of said engine falls below a predetermined limit; and means by which said thermostat renders inoperative only on some strokes said means for introducing an explosive charge whenever said means for introducing water is operative.

6. In an engine, the combination of: a cylinder; a piston movable in said cylinder; means for introducing an explosive charge into said cylinder; means for firing said charge; means for introducing water into said cylinder on some strokes only and only when the temperature of the engine exceeds a predetermined degree; and means for heating said water prior to its admission into said cylinder by the exhaust gases of the engine.

7. In an engine, the combination of: a cylinder; a piston movable in said cylinder; means for introducing an explosive charge into said cylinder; means for firing said charge; and means for introducing superheated water under high pressure into said cylinder in alternate cycles when the temperature of the engine exceeds a predetermined degree.

8. In an engine, the combination of: a cylinder; a piston fitting and moving in said cylinder; adjustable and thermostatically controlled means for introducing an explosive charge into said cylinder; means for firing said charge; adjustable and thermostatically controlled means for introducing water into said cylinder at a predetermined temperature limit; a thermostat actuated by the heat of said engine; and timing means actuated by said thermostat to render said explosive charge introducing means and said water introducing means respectively effective and ineffective in alternate cycles of said engine, after said predetermined temperature limit has been reached.

In testimony whereof, I have hereunto set my hand at Los Angeles, California, this 15th day of June, 1921.

LEWIS E. PORTER.